United States Patent [19]

Bock

[11] 3,837,715

[45] Sept. 24, 1974

[54] ROLLER GUIDE INCLUDING AXIAL BEARINGS

[75] Inventor: Nils Erik Bock, Smedjebacken, Sweden

[73] Assignee: Morgardshammar AB, Smedjebacken, Sweden

[22] Filed: Feb. 5, 1973

[21] Appl. No.: 329,836

[52] U.S. Cl............... 308/6 R, 308/20, 308/174
[51] Int. Cl. ................................... F10c 21/00
[58] Field of Search............ 308/6 R, 6 A, 6 B, 174, 308/175, 176, 168, 172, 163, 20

[56] References Cited
UNITED STATES PATENTS

| | | | |
|---|---|---|---|
| 1,865,842 | 7/1932 | Davidson | 308/18 |
| 2,523,847 | 9/1950 | Russey | 308/172 |
| 2,929,572 | 3/1960 | Baumgartner | 308/6 B |
| 3,050,351 | 8/1962 | Kempf | 308/174 |
| 3,194,611 | 7/1965 | Mahony | 308/6 R |
| 3,674,325 | 7/1972 | Moroney et al. | 308/163 |
| R26,578 | 5/1969 | Nauman | 308/163 |

FOREIGN PATENTS OR APPLICATIONS

| | | | |
|---|---|---|---|
| 977,380 | 3/1951 | France | 308/6 B |

*Primary Examiner*—Manuel A. Antonakas
*Assistant Examiner*—Barry Grossman

[57] ABSTRACT

A roller guide for guiding an elongated longitudinally traveling material into the grooves of the main rolls of a rolling mill has a pair of rollers, one on each side of the traveling material, mounted for rotation on parallel axes and contacting the material. Thrust bearings are provided at the upper and lower ends of each roller, each thrust bearing comprising an annular disc encircling a fixedly supported axle and constrained from rotation about the axle by a retainer device. Each disc is a separate part not secured to other parts of the roller guide. A lubricant and coolant flows under pressure through the axle, through a radial bearing of the roller and through an axial space between each end of the roller and its respective thrust bearing.

10 Claims, 5 Drawing Figures

PATENTED SEP 24 1974 3,837,715

ROLLER GUIDE INCLUDING AXIAL BEARINGS

BACKGROUND OF THE INVENTION

This invention relates to stock guiding equipment for use with rolling mills. Rolling mills employ pairs of main rolls through which the stock passes, for rolling the stock into various cross sections. The two main rolls rotate in opposite directions and have annular grooves between which the stock is squeezed.

Rolling mills are commonly equipped with one or more rollers guides whose function is to guide the stock into the grooves of the main rolls. A roller guide also holds the stock in a correct angular position so that it does not tilt when it enters the grooves of the main rolls, because tilting would result in a defective product. The roller guide is mounted on the rolling mill as closely as possible to the main rolls, and often has a funnel-shaped opening at one end for receiving the stock. The roller guide also has two guide rollers at its output end, located very close to the main rolls, and rotatable on horizontally spaced vertically extending axes.

The guide rollers, which are shaped like capstans, press upon the sides of the stock to prevent stock rotation and to guide the stock accurately into the main rolls. Because of the concave capstan shape of the rollers, the rollers frequently receive some vertically directed forces from the stock which is being guided; consequently a thrust bearing must be provided at the upper and lower end of each roller to receive the vertically directed forces.

In the prior art, bearings capable of carrying both axial and radial forces were employed for mounting the rollers of a roller guide on their axles, but their operation was not satisfactory, especially for high speed roller guides of small dimensions, and the speed of the entire rolling mill had to be restricted to speeds below a maximum at which the roller guides could operate.

Attempts were made in the prior art to solve this problem by providing separate radial plain bearings and axial bearings. Equipment was tried which had needle bearings for receiving radial forces and had separate axial thrust bearings in the form of discs for receiving the axial forces, with the discs fixedly mounted to a holder portion of the roller guide which supports the roller.

Axial bearings of this type proved to be seriously deficient because of a very high requirement for plane parallelism between the thrust bearings and the end surfaces of the rollers which they engage. This requirement could not be met because the methods of affixing the discs to the holders destroyed the parallelism. In an effort to produce roller guides whose thrust bearings were in a precisely parallel relationship to each other and to the end surfaces of the roller, the metal discs which were intended to serve as thrust bearings were secured to the holder portion of the roller guide by various methods such as by welding or gluing. Upon completion of the securing process, however, these techniques did not often result in plane parallel thrust bearings.

SUMMARY OF THE INVENTION

The present invention is directed to a roller guide constructed so as to provide for plane parallelism between the axial disc thrust bearings of a roller guide and the end surfaces of the rollers. In the present invention, each thrust bearing is an annular disc encircling the axle. The annular disc is not secured to the holder in any fashion, thus the problems introduced by such securing are avoided. The thrust bearing is constrained from rotating by a suitable retainer. A fluid such as oil or water flows under pressure into a cavity at one end of the axle and down a channel in the center of the axle to a point on the axle midway between the ends of the roller, at which point the channel turns 90° to conduct the fluid radially outward to the radial bearing of the roller. From the radial bearing the fluid flows upward and downward along the outer surface of the axle to the thrust bearings at each end of the roller, where it flows radially outward in the space between each thrust bearing and the respective end of the roller. The fluid lubricates and cools both the radial bearing and the thrust bearings, and also serves as a cushion between the ends of the roller and the thrust bearings. As a result, the axial thrust bearings can effectively operate at high roller speeds, with heavy loads and with a minimum of wear.

Accordingly, a first object of the present invention is to provide a roller guide for guiding an elongated traveling material and having a pair of roller assemblies for rotation on parallel horizontally spaced vertical axes on opposite sides of the material, each roller being rotationally mounted on an axle and having thrust bearings at its opposite ends and wherein the thrust bearings are separate annular discs which are constrained from rotation by retainers associated with a supporting holder.

A further object of the invention is to provide a roller guide, as noted in the preceeding paragraph, and in which the retainers for preventing rotation of the annular thrust disc bearings are generally flat annular members that are irregularly shaped on their inner and outer peripheries, and which receive the disc bearings and are received in irregularly shaped portions of the holder to prevent rotation of the thrust bearing.

Still another object is to provide a roller guide as noted and having, in addition, shims located between the supporting holder and the thrust bearings.

Yet another object of the invention is to provide a roller guide as noted above, in which each roller is equipped with a radial bearing and in which a fluid flow system passes fluid under pressure along a route which includes the radial bearing and also includes spaces between the thrust bearings and the ends of the rollers.

DESCRIPTION OF THE DRAWINGS

The foregoing and other objects and features of the invention will become more apparent upon consideration of the following description taken in conjunction with the accompanying drawings, in which.

DESCRIPTION OF THE PREFERRED EMBODIMENT

Figure 1:
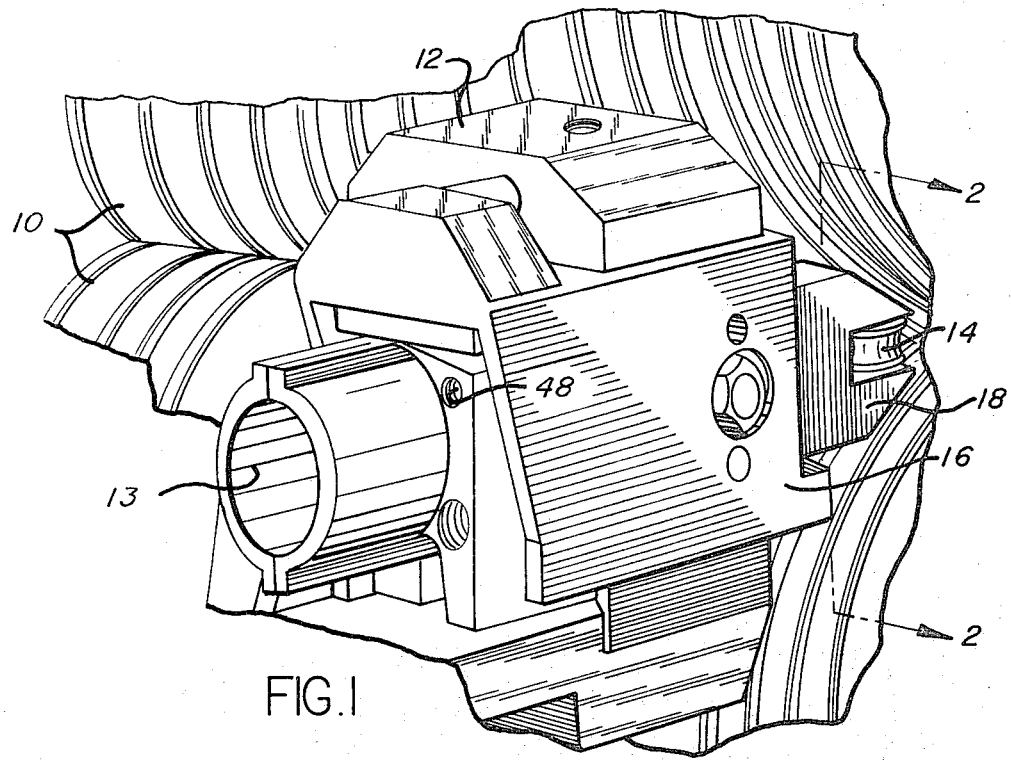
FIG. 1 is a pictorial view of a roller guide mounted in place on a rolling mill with its guide rollers located close to the main rolls of the rolling mill.

A rolling mill shown in FIG. 1 has a pair of main roll 10 mounted one above the other in close proximity and rotationally powered for rolling rod, wire, bar stock, or other elongated longitudinally traveling material. The stock to be rolled by the rolls 10 is guided into a proper position between the rolls 10 by a roller guide 12. The roller guide 12 includes a pair of guide rollers 14, only one of which is shown in FIG. 1, supported on vertical axes in a position close to the main rolls for guiding the stock by pressing on it from the sides.

The stock to be rolled (not shown) enters the roller guide 12 at an opening 13 at the left side of FIG. 1, and passes through the roller guide 12 and then through the main rolls 10, exiting from the rolling mill on the other side of the main rolls.

The roller guide 12 has a housing 16, which is fixedly mounted to a structural portion of the rolling mill. The housing supports, among other things, two roller assemblies (only one of which is shown), each of which includes a holder 18 and one of the rollers 14, which is supported by the holder 18. The holders 18 are powerful leaf springs which pre-load the rollers 14 to press against the sides of the stock. The holders 18 together with the housing 16 may be regarded as a housing means.

Figure 2:
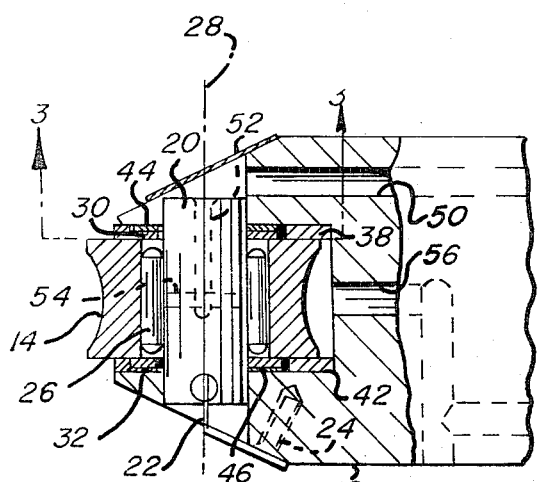
FIG. 2 is a side elevation view, partly in section, showing one of the two roller assemblies of the guide roller of FIG. 1, taken along lines 2—2 of FIG. 1.
Figure 3:
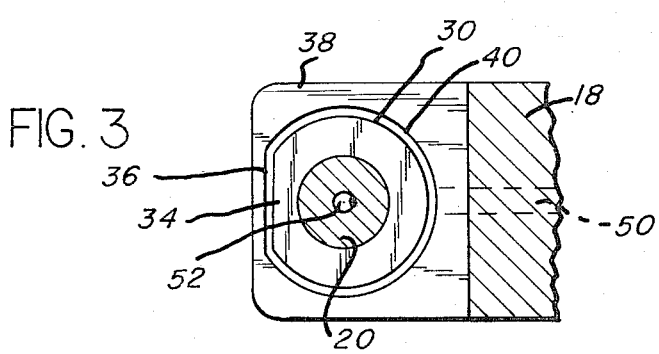
FIG. 3 shows a thrust bearing portion of the roller assembly of FIG. 2 taken along lines 3—3 of FIG. 2.

As shown in FIG. 2, an axle 20 is fixedly mounted in the holder 18 and retained by a clip 22 which is fastened to the holder 18 by means of a screw 24. The roller 14 is rotationally mounted on the axle 20 by a radial bearing 26. The roller 14 at its planar upper and lower end surfaces engages upper and lower thrust bearings 30, 32, respectively. The thrust bearings 30, 32 are flat disc-shaped metal pieces, each having a straight portion 34 on its outer periphery, as can be seen more clearly in FIG. 3.

Figure 4:
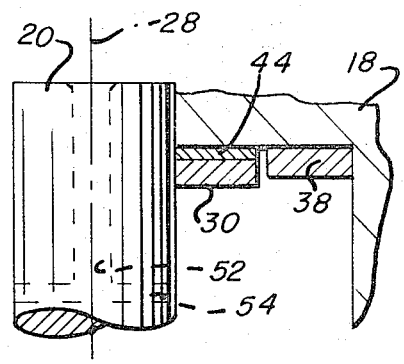
FIG. 4 is an enlarged view of a portion of FIG. 2 showing part of an upper thrust bearing and a shim, and omitting the roller.

The straight portion 34 of the thrust bearing 30 engages a similar straight portion 36 of a hole 40 in a retainer 38, whose purpose is to prevent the thrust bearing 30 from rotating about the axis 28. The outer periphery of the thrust bearing 30 fits loosely enough in the hole 40, which is cut through the retainer 38, to permit the thrust bearing 30 to be readily received therein during assembly. Shims 44, 46 having a shape similar to that of the thrust bearings 30, 32, are inserted between the holder 18 and the thrust bearings 30, 32. FIG. 4 shows with exaggerated dimensions that the shims 44 together with the thrust bearing 30 are thicker than the retainer 38. The same is true at the lower thrust bearing. The upper and lower retainers 38, 42, respectively, can be affixed to the holder 18 by welding, if desired.

A path is provided through each roller assembly for flow of fluid such as oil or water. The fluid enters at an input port 48, FIG. 1, and passes through a channel 50, FIG. 2, into a central axial channel 52 in the axle 20. The fluid is transmitted through one or more radial holes 54 in the axle 20, to flow around the radial bearing 26 of the roller 14. The fluid then flows radially between each thrust bearing 30, 32 and the respective upper and lower surfaces of the roller 14, after which portions of the fluid leave the roller assembly through an output channel 56.

During operation of the rolling mill, the stock to be rolled travels through the roller guide 12 between the rollers 14, which bear upon its sides. The rollers rotate, and they guide the stock both horizontally and vertically because of the concave shape of the outer surfaces of the rollers 14. When the stock tends to move upward, it imparts an axial force to the rollers 14. Each roller 14 thereupon presses on its upper thrust bearing 30, which in turn bears upon the shims 44. The shims 44 transmit the thrust to the holder 18 and thence to the housing 16 of the roller guide 12, as a result of which the stock is restrained from upward movement with no appreciable axial movement of the rollers 14.

At the same time, fluid passes through the input channel 50, the axle holes 52, 54, past the roller bearings 26, between both the upper and lower end surfaces of the roller 14 and their respective thrust bearings 30, 32, and between the retainers 38, 42 and the roller's end surfaces. The fluid flowing over the thrust bearings serves as a cushion, and also serves as a lubricant and coolant for both the radial bearing 26 and the axial thrust bearings 30, 32.

The shims 44, 46 are selected so that the thrust bearings 30, 32 do not apply a substantial axial force on the roller 14. In fact, sufficient axial space is allowed between the roller 14 and the thrust bearings 30, 32, to accommodate a film of lubricating fluid between the opposite ends of the roller 14 and the respective bearings 30, 32. Of course, the roller 14 is restrained from axial shifting movement by the bearings 30, 32.

From the above, it should be apparent that the thrust bearings 30 and 32 are unattached to the holder, and, accordingly, any possibility of the bearings 30, 32 becoming out of parallelism due to attaching techniques is completely avoided. In addition, the construction is such that a lubricant film is provided between the axial thrust bearings and the ends of the roller, and the construction is such that it provides for high speed roller operation with a little wear of either the roller or the axial thrust bearings.

Figure 5:
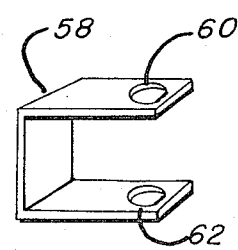
FIG. 5 is a pictorial view of a second embodiment of a retainer portion of the roller asembly.

In another embodiment of the same invention, FIG. 5, the retainers 38, 42 are united, being the two legs of a U-shaped member 58. The legs have holes 60, 62 which perform the same functions as were performed by the hole 40 described above. The U-shaped member 58 is secured by screws to the holder 18, to establish a connection which is more precise than connection by welding.

What is claimed is:

1. A roller guide for guiding elongated longitudinally traveling bar stock to be shaped in a rolling mill comprising housing means, a pair of roller assemblies supported by said housing means at spaced locations, each roller assembly including an axle supported at its ends in said housing and a roller rotationally mounted on the axle and having a surface engagable with the bar stock and for guiding the traveling bar stock into a rolling mill, each roller having a surface at each of its axial ends for transmitting thrust, two thrust bearings associated with said housing and each proximate one of said end surfaces respectively, each of said thrust bearings comprising a disc which is interposed between said housing means and said roller and being unattached to either said housing means or said roller, and fluid directing means for providing a fluid film between each of said discs and the respective axial end surface of said roller.

2. A roller guide as defined in claim 1 and wherein said discs are axially spaced apart to provide a space for said film of fluid between said roller and each of said discs, and wherein said housing means comprises a pair of retainers each of which engages one of said discs for preventing rotation of each of said discs about said axle.

3. A roller guide as defined in claim 2 and wherein each of said retainers comprises a generally annular retaining member having irregularly shaped portions for engaging correspondingly shaped portions of an associated one of said discs to prevent rotation of the disc.

4. A roller guide as defined in claim 3 and further comprising shims located between said housing means and said discs, for establishing said space and transmitting axial forces therebetween.

5. A roller guide as defined in claim 1 and wherein said fluid directing means comprises means for providing a flow of fluid along a route through the roller guide under pressure, said fluid flow having a component of velocity between said disc and said respective end surface of said roller that is directed along a line extending radially from said axle.

6. A roller guide as defined in claim 5 and wherein said roller is equipped with a radial bearing for transmitting radial force to said axle, and wherein said route for fluid flow includes said radial bearing.

7. A roller guide for guiding an elongated longitudinally traveling material comprising housing means, a pair of roller assemblies supported by said housing means at spaced locations, each roller assembly including an axle supported at its ends in said housing and a roller rotationally mounted on the axle for guiding the traveling material and having a surface at each of its axial ends for transmitting thrust, two thrust bearings associated with said housing and each proximate one of said end surfaces respectively, each of said thrust bearings comprising a disc which is interposed between said housing means and said roller and being unattached to either said housing means or said roller, said discs being axially spaced apart to provide a space for said film of fluid between said roller and each of said discs, said housing means comprising a pair of retainers each of which comprises a generally annular retaining member having irregularly shaped portions for engaging correspondingly shaped portions of an associated one of said discs to prevent rotation of the disc, and fluid directing means for providing a fluid film between each of said discs and the respective axial end surface of said roller.

8. A roller guide as defined in claim 7 and further comprising shims located between said housing means and said discs, for establishing said space and transmitting axial forces therebetween.

9. A roller guide as defined in claim 7 and wherein said fluid directing means comprises means for providing a flow of fluid along a route through the roller guide under pressure, said fluid flow having a component of velocity between said disc and said respective end surface of said roller that is directed along a line extending radially from said axle.

10. A roller guide as defined in claim 7 and wherein said roller is equipped with a radial bearing for transmitting radial force to said axle, and wherein said route for fluid flow includes said radial bearing.

* * * * *

UNITED STATES PATENT OFFICE
CERTIFICATE OF CORRECTION

Patent No. 3,837,715  Dated September 24, 1974

Inventor(s) Nils Erik Bock

It is certified that error appears in the above-identified patent and that said Letters Patent are hereby corrected as shown below:

After the United States application data, please insert the foreign application priority data as follows:

--Foreign Application Priority Data
February 4, 1972  Sweden....1313/72--

Signed and sealed this 17th day of December 1974.

(SEAL)
Attest:

McCOY M. GIBSON JR.
Attesting Officer

C. MARSHALL DANN
Commissioner of Patents

FORM PO-1050 (10-69)